United States Patent [19]

Jabusch

[11] Patent Number: 5,167,379
[45] Date of Patent: Dec. 1, 1992

[54] SELF-LOCKING BELT ROLLER

[75] Inventor: Ronald Jabusch, Elmshorn, Fed. Rep. of Germany

[73] Assignee: Autoflug GmbH & Co. Fahrzeugtechnik, Rellingen, Fed. Rep. of Germany

[21] Appl. No.: 653,637

[22] Filed: Feb. 8, 1991

[30] Foreign Application Priority Data

Feb. 10, 1990 [DE] Fed. Rep. of Germany ....... 4004090

[51] Int. Cl.$^5$ ............................................. B60R 22/36
[52] U.S. Cl. .......................................... 242/107.40 R
[58] Field of Search ................. 242/107.4 R, 107.4 A, 242/107.4 B, 107.4 D; 280/806

[56] References Cited

U.S. PATENT DOCUMENTS

| 4,518,132 | 5/1985 | Schmidt | 242/107.4 A |
| 4,597,546 | 7/1986 | Yamamoto | 242/107.4 R X |
| 5,037,038 | 8/1991 | Zygutis et al. | 242/107.4 R X |

FOREIGN PATENT DOCUMENTS 7425341 3/1978 Fed. Rep. of Germany .
3615443 11/1986 Fed. Rep. of Germany .

*Primary Examiner*—John M. Jillions
*Attorney, Agent, or Firm*—Robert W. Becker & Associates

[57] ABSTRACT

In a self-locking belt roller, especially for motor vehicles, having a vehicle-sensitive and/or belt-sensitive control system for its locking element, which in the blocking case prevents further rotation of the belt winding shaft, and having a winding-up spring acting on the belt winding shaft, in certain operational conditions the blocking system of the belt roller should be permanently ready to operate. In this respect a device, becoming operative when the belt is completely unwound and becoming inoperative when the belt is wound up, is provided for fixing the control system in its position which brings about the blocking position of the locking element upon extraction of the belt, this device being actuated by the belt winding up and unwinding.

3 Claims, 4 Drawing Sheets

SELF-LOCKING BELT ROLLER

BACKGROUND OF THE INVENTION

This invention concerns a self-locking belt roller, especially for motor vehicle safety belts, having a vehicle-sensitive and/or belt-sensitive control system for a locking element, which in the blocking condition prevents further rotation of the belt winding shaft, and having a winding-up spring acting on the belt winding shaft.

A belt roller of this type is described for example in DE-GM 74 25 341. The belt roller has an associated vehicle-sensitive and a belt-sensitive control system, which, when accelerations or decelerations act on the vehicle or when belt extraction occurs too fast, moves the locking element, mounted on the belt winding shaft so that it can be pivoted out radially, into a housing-fixed teeth arrangement and thus effects locking of further unwinding movement of the belt winding shaft. Through a loosening of the belt over a small retracting path into the belt roller, the blocking of the locking element is cancelled and the self-locking belt roller is again ready for use.

For certain cases of application it is required that, with such a self-locking belt roller, equipped with a vehicle-sensitive and/or a belt-sensitive control system, in certain operational positions the blocking system should be connected permanently so that after reaching a certain operational position of belt extraction only a winding-up of the belt is still possible without the possibility of a renewed belt extraction, whereby the blocking readiness of the self-locking belt roller is only reinstated when the belt is sufficiently retracted. Such a case of application exists especially when a child's seat is to be fastened in t he vehicle with the self-locking belt roller. In this connection, a length of belt is extracted from the self-locking belt roller and guided around and engaged with suitably configured attachment points on the child's seat. Since the self-locking belt roller only locks in cases of emergency, the child's seat cannot be fastened down in the vehicle because the bracing of the belt is only determined by the force of the winding-up spring. In addition, the child sitting in the child's seat can extract more belt from the self-locking belt roller in a playful manner so that when an accident occurs belt slack is present and the child's seat is no longer fastened securely in the vehicle. On the other hand, however, there is the requirement that the normal functional behavior of a self-locking belt roller should be present when an older child or adult is to be secured by it, in order to utilize the comfort offered by a self-locking belt roller.

In the prior art, corresponding for example to DE-OS 36 15 443, so-called semiautomatic machines are known, in which during the extraction movement of the belt from the belt winding shaft the blocking system is disconnected and is only connected by the belt returning a little way onto the belt roller. With such belt rollers the connection of the blocking system takes place permanently, that is to say when the blocking system is connected the belt winding shaft is constantly blocked. In this way, indeed, a child's seat can be secured adequately although when an older child or adult uses the safety-belt system the advantages of a self-locking belt roller are lost, such as the freedom of movement of the person buckled-in due to the fact that the belt can be extracted from the belt roller and the belt roller is only brought into the blocking position, when an accident occurs, by means of the vehicle-sensitive or belt-sensitive control system.

The object of the invention therefore is to create a self-locking belt roller of the type named at the beginning, in which in a predetermined operational state a winding-up of the belt is possible, although an extraction of the belt is prevented.

This object including advantageous developments and further embodiments is achieved by the present invention as disclosed by the following description and claims.

SUMMARY OF THE INVENTION

According to the present invention there is provided a self-locking belt roller, especially for motor vehicle safety belts, having a control system for a locking element which responds to acceleration, which locking element in a belt-winding blocking condition prevents further rotation of a belt winding shaft that is resiliently biased in the belt winding-up direction, wherein a blocking device is provided which has a switching lever mounted in a bistable manner, i.e. in a pivotable manner with two end positions, this device being actuated by belt extraction and retraction, whereby, in a completely unwound extracted position of the belt, blocking of the belt roller against further belt extraction is effected, and unblocking of this blocking is effected in the retracted position of the belt; the switching lever being actuated by the belt when located at the end of belt extraction in extended course to pivot into engagement with an external teeth arrangement of a control member of a belt-sensitive and/or vehicle-sensitive control system of the belt roller, and when the belt is retracted to pivot out of engagement with said teeth arrangement so as to release said control member.

The invention thus contains t he fundamental idea that a blocking device is provided, becoming operative in the belt completely extracted position and becoming inoperative in the belt fully retracted condition, for fixing the control system for the locking element in its position which brings about the blocking position of the locking element with respect to further belt extraction, which blocking device is actuated by the belt winding off and on. From this the advantage results that first of all the self-locking belt roller can be used in the usual way from the fastening of a person's seat belt, whereby the belt roller offers the known wearing comfort and when an accident occurs secures the person by the activation of the blocking system. If a child's seat is to be fixed with the self-locking belt roller then the belt is completely unwound from the belt roller, whereby in the end phase of the belt extraction the blocking device according to the invention is actuated by the belt, which device acts on the control system of the self-locking belt roller in such a way that only a retraction of the belt is still possible, while a small renewed belt extraction immediately leads to a locking of the belt roller. In this way after the fastening of the child's seat it is guaranteed that the child sitting in the child's seat cannot extract more belt from the self-locking belt roller because this extraction movement is prevented by the engaged blocking system. If the child's seat is removed and if this function of the belt roller is no longer required, then the belt winds up completely. With the belt completely wound up the belt acts on the device in the sense of disconnecting the device, so that the control system thereafter carries out its normal control function. Thus, the self-looking belt roller can be used in the usual way for seat-belt-fastening procedures.

With the solution according to the invention the advantage is obtained that the locking element itself is not moved into its blocking position because during the desired, and only possible, winding-up movement of the belt the looking element in this respect would have to slide past latching arrangements so that the relevant parts are subjected to a corresponding strain. Through the development according to the invention with fixing of the control system, rather the prerequisite is created so that with an occurring belt extraction during the winding-up movement of the belt the locking element is moved into its blocking position immediately, as is also given with the starting of the vehicle-sensitive or belt-sensitive control system.

Furthermore, with the formation according to the invention the advantage is obtained that for the control of the blocking device the belt itself is used during its unwinding or winding-up movement so that in this way the switching points for the operative and inoperative position of the device can be determined simply and securely.

So far as according to an exemplary embodiment of the invention the vehicle-sensitive or belt-sensitive control system has an externally geared control disc for the control of the locking element, as described also in DE-GM 74 25 231, a preferred exemplary embodiment of the invention is concerned with providing a switching lever acted upon by the belt, which switching lever, with a belt course occurring at the end of the belt extraction, is pivoted into the teeth arrangement of the control disc, and, with the belt wound up, reaches a release position for the control disc. In this respect the switching lever is constructed preferably in a two-armed manner with a contact arm for contacting the belt during extraction and retraction and with a locking arm cooperating with the teeth arrangement of the control disc. In this way if the belt is extracted almost completely from the belt winding shaft, then in the last phase it acts on the switching lever which pivots into the external teeth arrangement of the control disc and thus fixes this in a position in which indeed a winding-up movement of the belt winding shaft is possible with corresponding untwisting of the control disc, during which, however, the control disc in belt extraction direction is fixed by the locking arm of the switching lever, so that the relative movement between the now stationary control disc and the belt winding shaft rotating during belt extraction is converted into movement of the locking element to bring about blocking of the belt extraction.

According to a preferred exemplary embodiment it is provided that a draw spring is arranged between the belt roller housing and the locking arm of the switching lever, the hinge point of this spring on the housing being arranged between the end positions of the looking arm in such a way that the locking arm of the switching lever is spring-loaded in its two movement directions past a dead position. In this way the switching points of the switching lever can be fixed exactly so that the belt is only required as a trigger for the introduction of the switching movement and does not itself act directly on the switching lever to achieve the movement thereof. Since, furthermore, the draw spring is relaxed in the two end positions of the locking arm of the switching lever, the spring can be constructed for example from synthetic material, whereby it is advantageous to combine change-over lever and spring element into one synthetic-material part.

The distance between the locking arm and the contact arm of the switching lever in this connection is measured in such a way that at the desired thickness of the belt winding on the belt winding shaft the locking arm is released from the teeth arrangement of the control disc, or in the belt unwound condition engages into the external teeth arrangement of the control disc. The contact arm of the switching lever in this connection in the one switching position rests on the belt which is winding off, and in the other switching position on the belt which is winding on and which builds itself up during belt retraction.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
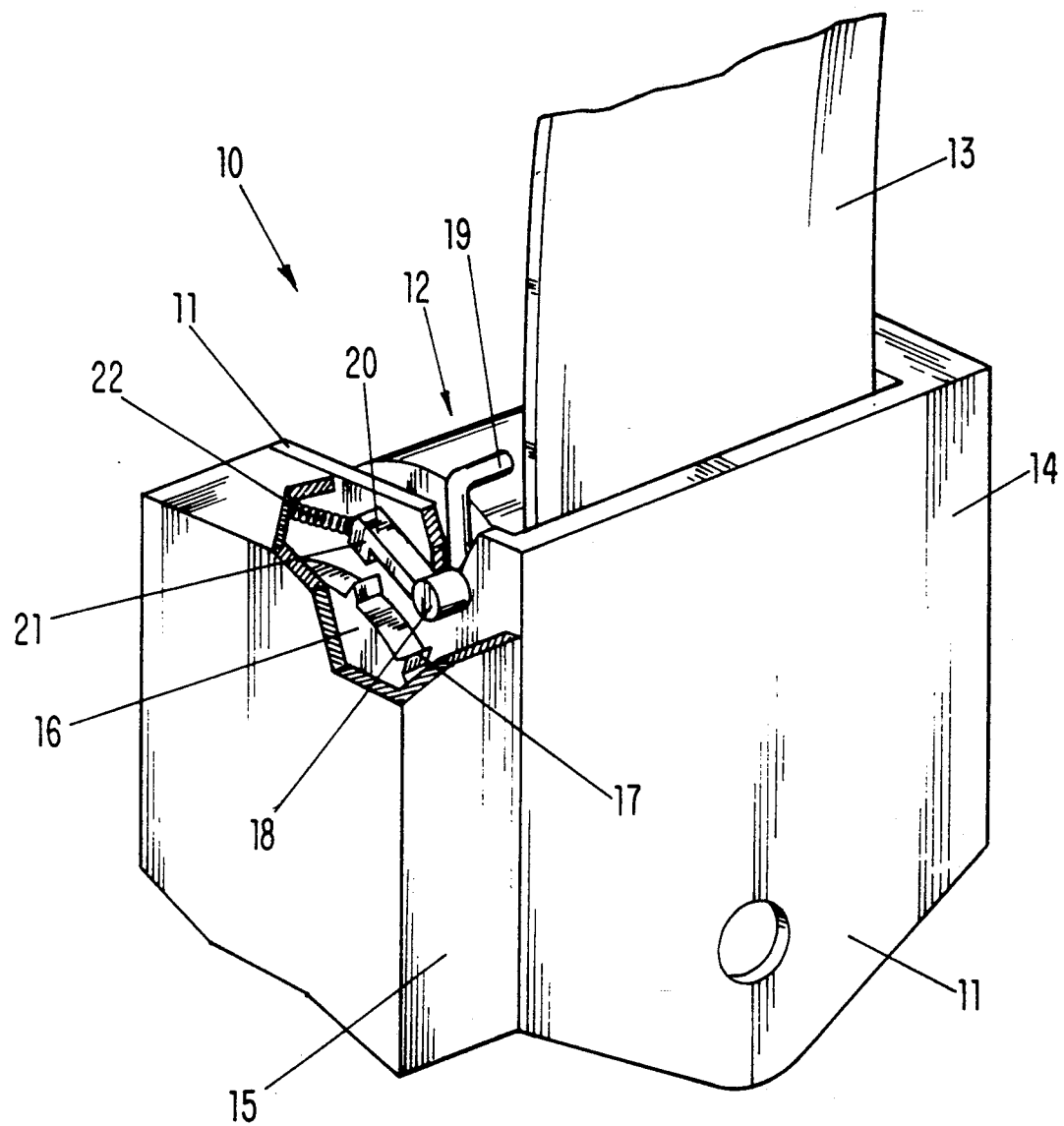
FIG. 1 is a diagrammatic perspective view, partly broken away, of a self-locking belt roller and its casing.

Referring first to FIG. 1, the belt roller 10 has a U-shaped frame 11 in which a belt winding shaft 12 is mounted with a belt 13 wound thereon. On a limb of the frame 11 there is located, under a covering casing 14, a winding-up spring, while on the other limb of the U-frame 11 there is mounted, concealed under a further casing 15, the blocking system with a belt-sensitive and a vehicle-sensitive control system. Of this control system a control disc 16 with an external teeth arrangement 17 is visible. This disc 16 is mounted on the belt winding shaft 12 and is coupled to a locking element, arranged on the shaft 12 so that the locking element can be moved radially in such a way that, with the control disc 16 stationary and the belt winding shaft 12 rotating, a movement of the locking element into its blocking position takes place and therefore blocking of the belt winding shaft is achieved.

On the system-side limb of the housing 11 a switching lever 18 is rotatably mounted. This lever 18 has a contact arm 19 disposed to be acted upon by the belt 13 and a locking arm 20 extending tangentially to the control disc 16. The locking arm 20 has a tooth 21 which in the associated stopping position pivots into the external teeth arrangement 17 of the control disc 16.

On the locking arm 20 of the switching lever 18 a draw spring 22 is hinged with its one end, which draw spring is fastened with its other end to the housing or frame 15, 11 of the belt roller 10, the hinge point being chosen such that the locking arm 20 of the switching lever 18 is spring-loaded in its two movement directions past a dead position. This is achieved especially when the hinge point is arranged at the angle bisector of the angle covered by the movement of the looking arm 20 from one end position (FIG. 1) into the other end position (FIG. 3).

Figure 2:
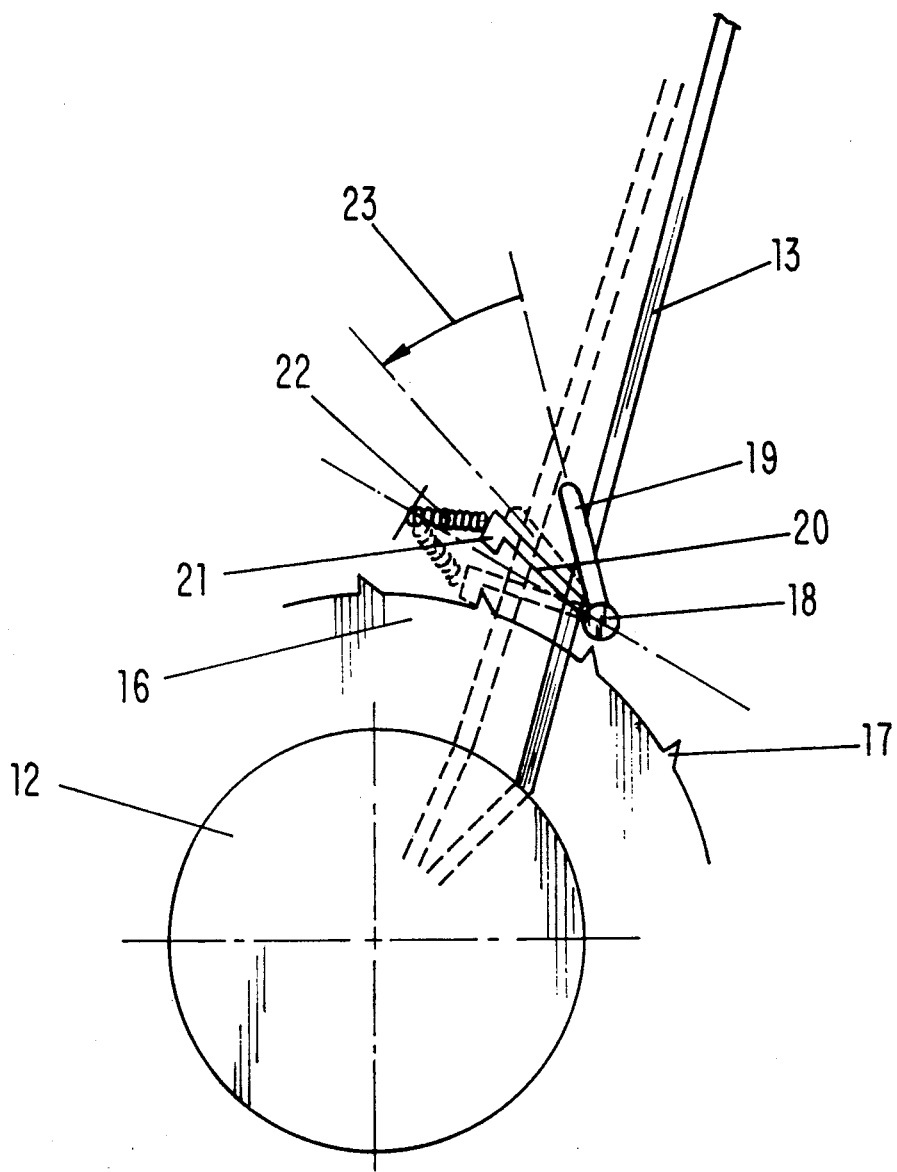
FIG. 2 is a schematic representation of the functional parts of a blocking system associated with the roller of FIG. 1.

As can be seen especially from FIG. 2, the actuation of the switching lever 18 takes place automatically when the belt is extracted completely, in that it is during the last tenth of the rotation of the belt winding shaft 12 that the belt 13 reaches its fully extended position (dotted lines in FIG. 2) and at this stage acts on the contact arm 19 of the switching lever 18 so that the switching lever 18 is pivoted in the direction of arrow 23. The spring 22 then forces switching lever 18 into the other end position (FIG. 3), in which the tooth 21 of the locking arm 20 engages into the external teeth arrangement 17 of the control disc 16. In this position, seen also in FIG. 2 in dotted lines, the control disc 16 is locked against a rotation of the belt winding shaft in the belt extraction direction, whereas it can rotate in the winding-up direction with the belt winding shaft. This means that after the change-over of the switching lever 18 into the position seen in dotted lines in FIG. 2 the belt can be retracted onto the belt roller while a slight extraction of the belt immediately leads to a blocking of this extraction movement.

Figure 3:
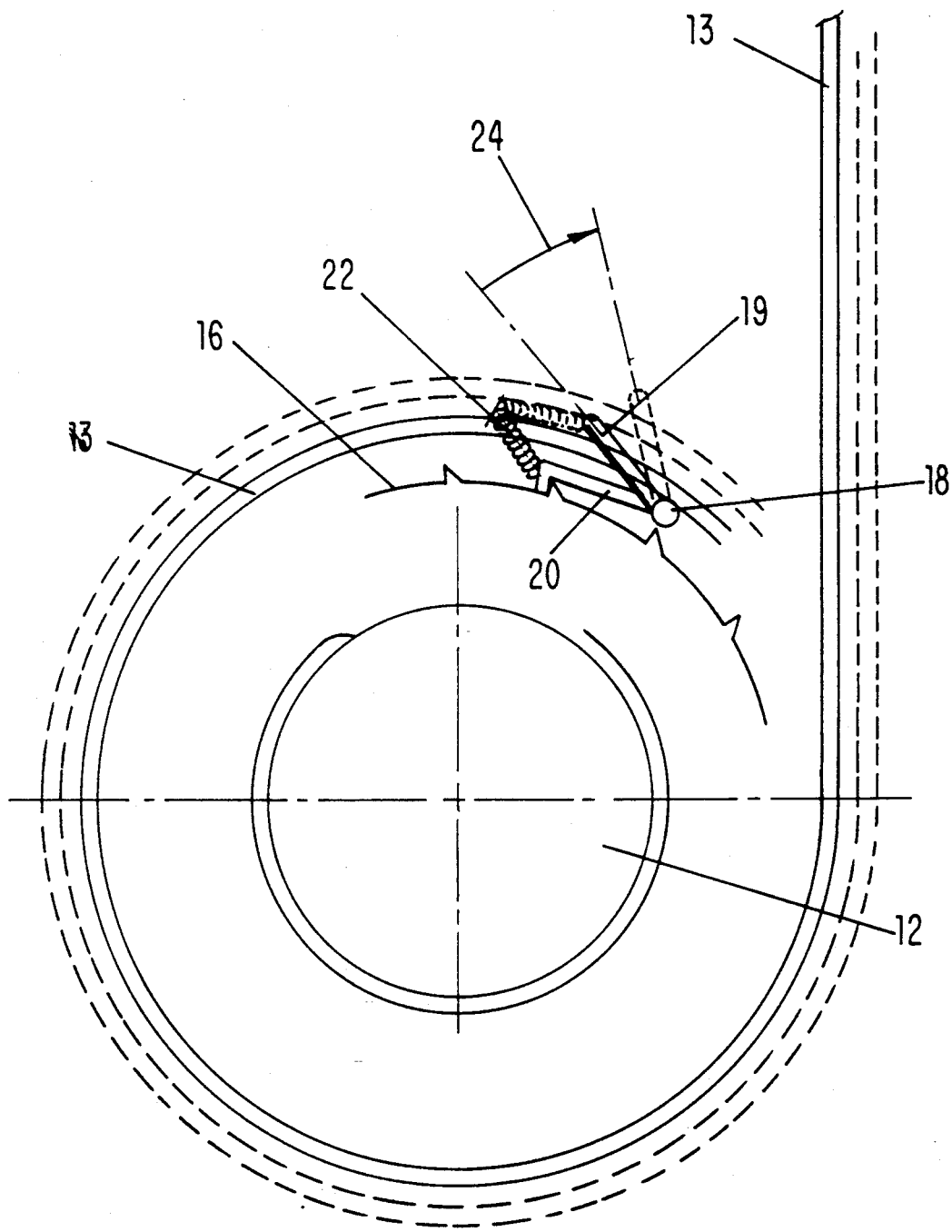
FIG. 3 is a schematic representation of the parts shown in FIG. 2, illustrating engagement and disconnection of the blocking system.

From FIG. 3 there emerges in detail the position in which the switching lever 18 is again moved back into its starting position, in that during retraction of the belt 13 the number of belt windings on the belt winding shaft 12 grows and as a result pivots the contact arm 19 of the switching lever 18 in the direction of the arrow 24. When the belt is sufficiently wound-up the locking arm 20 of the switching lever 18 is disengaged from the external teeth arrangement 17 of the control disc 16, and in this position the self-locking belt roller 10 can be used with its usual belt-sensitive and vehicle-sensitive control system without limitation.

From this function there is the result that, especially for the case when the self-locking belt roller 10 is to be used for fixing a child's safety seat in a motor vehicle, the belt is first unwound completely from the belt roller 10, whereby at the end of this belt unwinding the switching lever 18 is actuated in the manner described. Subsequent to this, the belt can now only retract onto the belt roller 10 so that the child's safety seat can be fixed without belt slack remaining. Once so fixed, however, a further belt extraction is not possible due to the position of the switching lever 18 so that the child sitting in the child's safety seat cannot extract any belt from the self-looking belt roller. If the safety belt is released and the child's safety seat is removed, then the belt 13 winds back onto the belt roller 10, and, at a corresponding thickness of the belt windings on the belt winding shaft 12, release of the switching lever 18 takes place into the position in which the control disc 16 is no longer loaded and can rotate freely. This free rotation of the control disc 16 is a prerequisite for the usual function of the belt-sensitive and vehicle-sensitive control system of the belt roller 10 so that the belt roller in its normal operation serves as a seat-belt-fastening means for people.

Figure 4:
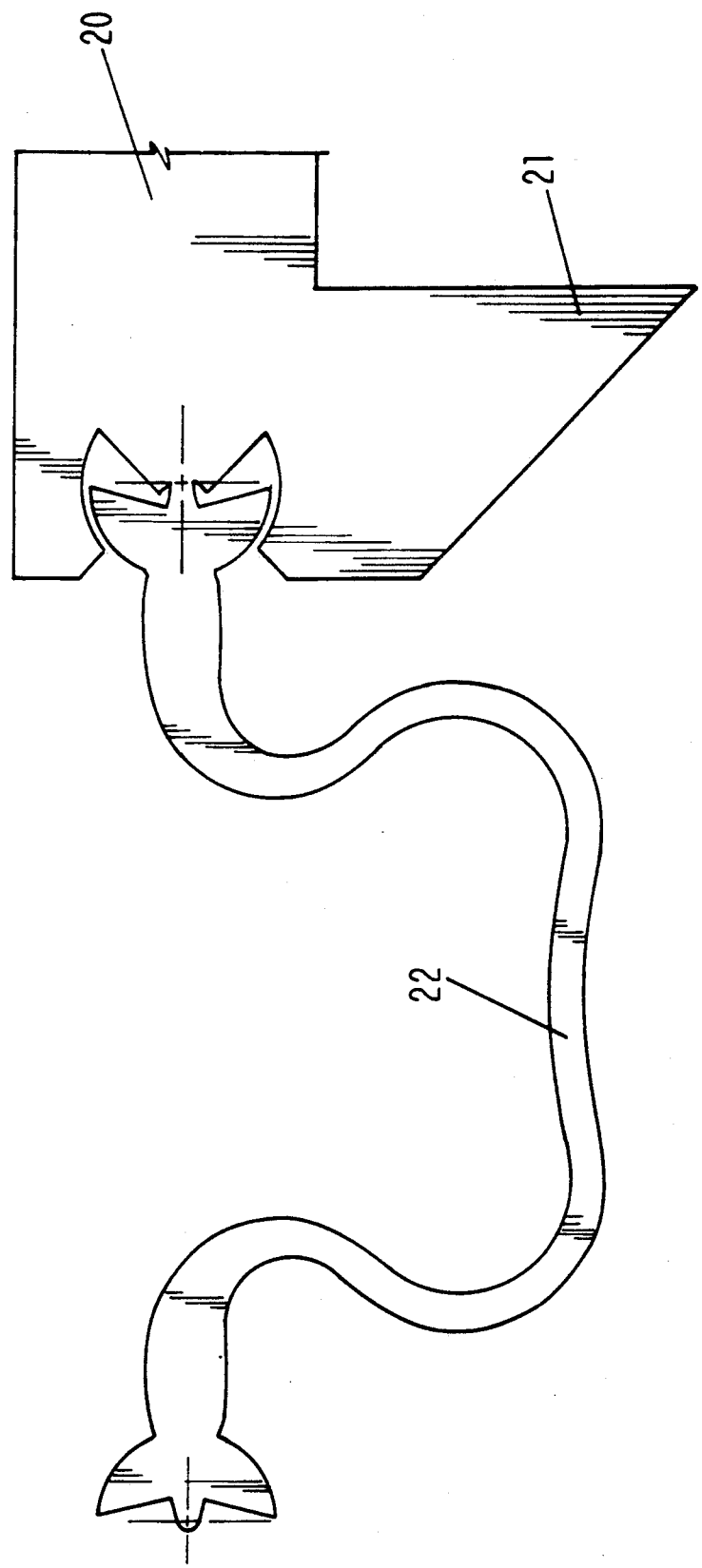
FIG. 4 shows a switching lever with a spring that is associated with the roller of FIG. 1.

In FIG. 4 there is shown a particular formation of the spring 22 which, as already explained, is relaxed in the two end positions of the locking arm 20 of the switching lever 18 and only exerts its action during the pivot movement of the switching lever 18. As can be seen from FIG. 4, the spring 22 can therefore be constructed from synthetic material because of the comparatively little strain placed thereupon, and can be preferably in one piece with the locking arm 20 of the switching lever 18, as indicated in FIG. 4. The free end of the spring 22 represented in this Figure is fastened to the housing 15 or frame 11 of the belt roller 10 in a suitable manner.

The features of the object of these documents made known in the above description, the claims, the abstract and the drawing can be essential both individually and in any combinations with one another for the realization of the invention in its various embodiments.

The present invention is, of course, in no way restricted to the specific disclosure of the specification and drawings, but also encompasses any modifications within the scope of the appended claims.

What I claim is:

1. A self-locking belt roller for safety belts, comprising:

a blocking device having a switching lever mounted in a pivotable manner with two end positions, said switching lever being actuated by belt extraction an belt retraction of said belt such that, when a completely extracted position of said belt is reached, said switching lever is pivoted into engagement with an external teeth arrangement of a control member of said blocking device so that blocking in a direction of belt extraction is achieved while belt retraction is possible, and, when a completely retracted position of said belt is reached, said switching lever is pivoted out of engagement with said teeth arrangement so as to release said control member;

said switching lever being a two-armed lever having a contact arm for contacting said belt during belt extraction and belt retraction; and said contact arm of said switching lever in an initial position, when said belt is completely retracted, resting on belt windings on said belt winding shaft, and during belt extraction resting on a run of said belt extending radially from said belt winding shaft, and at the end of belt extraction, said run of said belt having been displaced in a circumferential direction in correspondence to a reduction in diameter of said belt windings, pivoting said switching lever into engagement with said external teeth arrangement.

2. A self-locking belt roller according to claim 1, wherein said switching lever has a locking arm cooperating with said external teeth arrangement of said control member.

3. A self-locking belt roller according to claim 2, wherein a spring is arranged between a housing of said belt roller and said locking arm of said switching lever, and a hinge point of said spring at said housing is arranged between two positions, by which a pivoting movement of said locking arm is limited, in such a way that said locking arm of said switching lever is spring-loaded in each direction of said pivoting movement past a dead point between said two positions.

* * * * *